United States Patent [19]

Granger

[11] Patent Number: 5,715,866
[45] Date of Patent: Feb. 10, 1998

[54] PORTABLE FLUID DISPENSING APPARATUS

[76] Inventor: Melforde A. Granger, 1592 W. Shannon Ct., Chandler, Ariz. 85224

[21] Appl. No.: 581,344

[22] Filed: Dec. 29, 1995

[51] Int. Cl.[6] .................................................. F16K 31/02
[52] U.S. Cl. ............................. 137/624.11; 137/487.5; 239/68; 239/69
[58] Field of Search ........................ 137/624.11, 487.5, 137/624.12; 239/68, 69, 67

[56] References Cited

U.S. PATENT DOCUMENTS

| | | | |
|---|---|---|---|
| 4,012,673 | 3/1977 | Saarem et al. | 137/624.11 X |
| 4,592,505 | 6/1986 | Bruninga et al. | |
| 4,633,905 | 1/1987 | Wang . | |
| 4,718,454 | 1/1988 | Appleby | 137/624.11 |
| 4,744,515 | 5/1988 | Watanabe . | |
| 4,791,948 | 12/1988 | Bayat . | |
| 4,797,820 | 1/1989 | Wilson et al. | |
| 4,807,664 | 2/1989 | Wilson et al. | |
| 4,834,265 | 5/1989 | Snyder . | |
| 4,921,001 | 5/1990 | Pittsinger . | |
| 5,009,192 | 4/1991 | Burman . | |

*Primary Examiner*—Kevin Lee
*Attorney, Agent, or Firm*—Parsons & Goltry; Robert A. Parsons; Michael W. Goltry

[57] ABSTRACT

A portable apparatus for selectively delivering a fluid to at least one selected remote location for a selected duration, the apparatus including a housing having an inlet for receiving the fluid from a fluid source, and an outlet for expelling the fluid, a valve assembly for controlling the passage of fluid from the inlet to the outlet, a fluid sensitive transducer operative for sensing a fluid stimulus and for opening the valve assembly consonant therewith, and an programmable clock timer assembly operative for actuating the transducer, and for selectively closing the valve assembly after fluid has passed through the outlet for a selected duration.

17 Claims, 2 Drawing Sheets

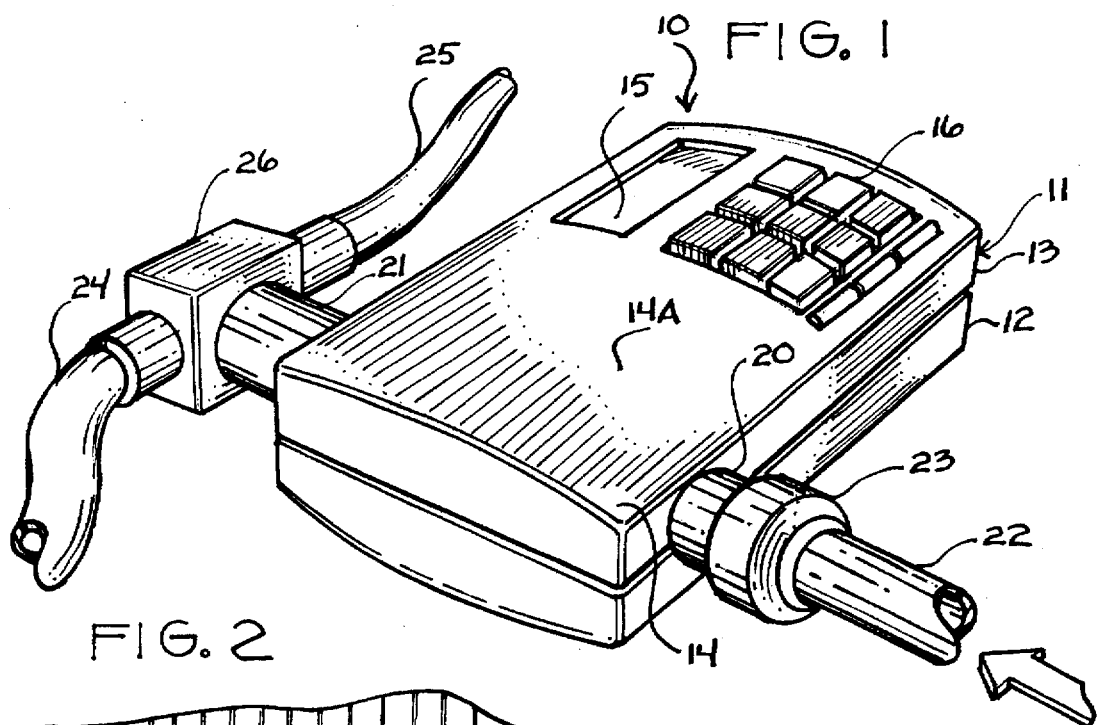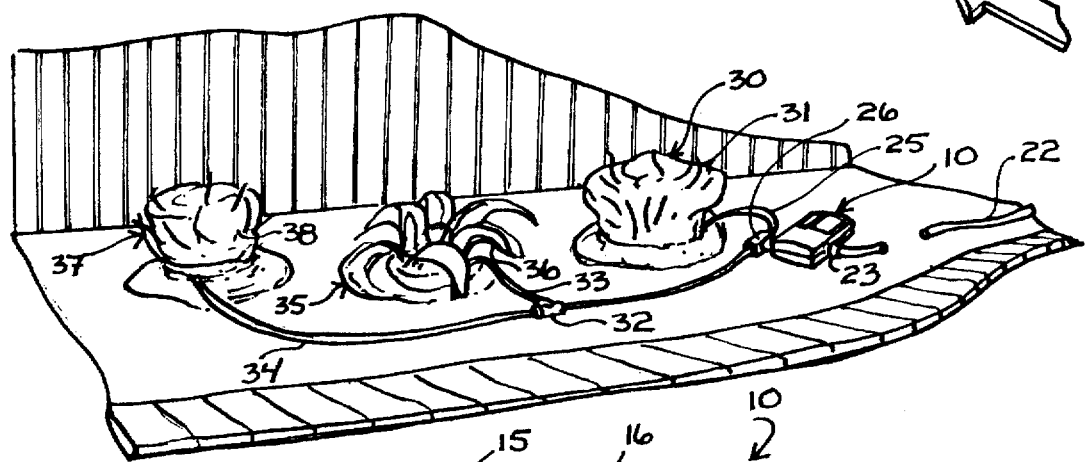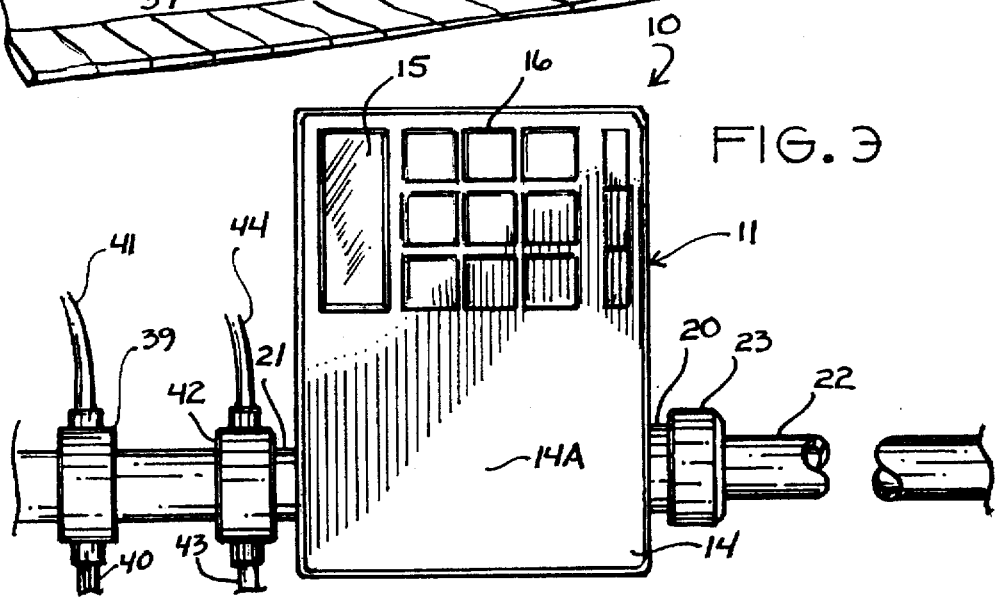

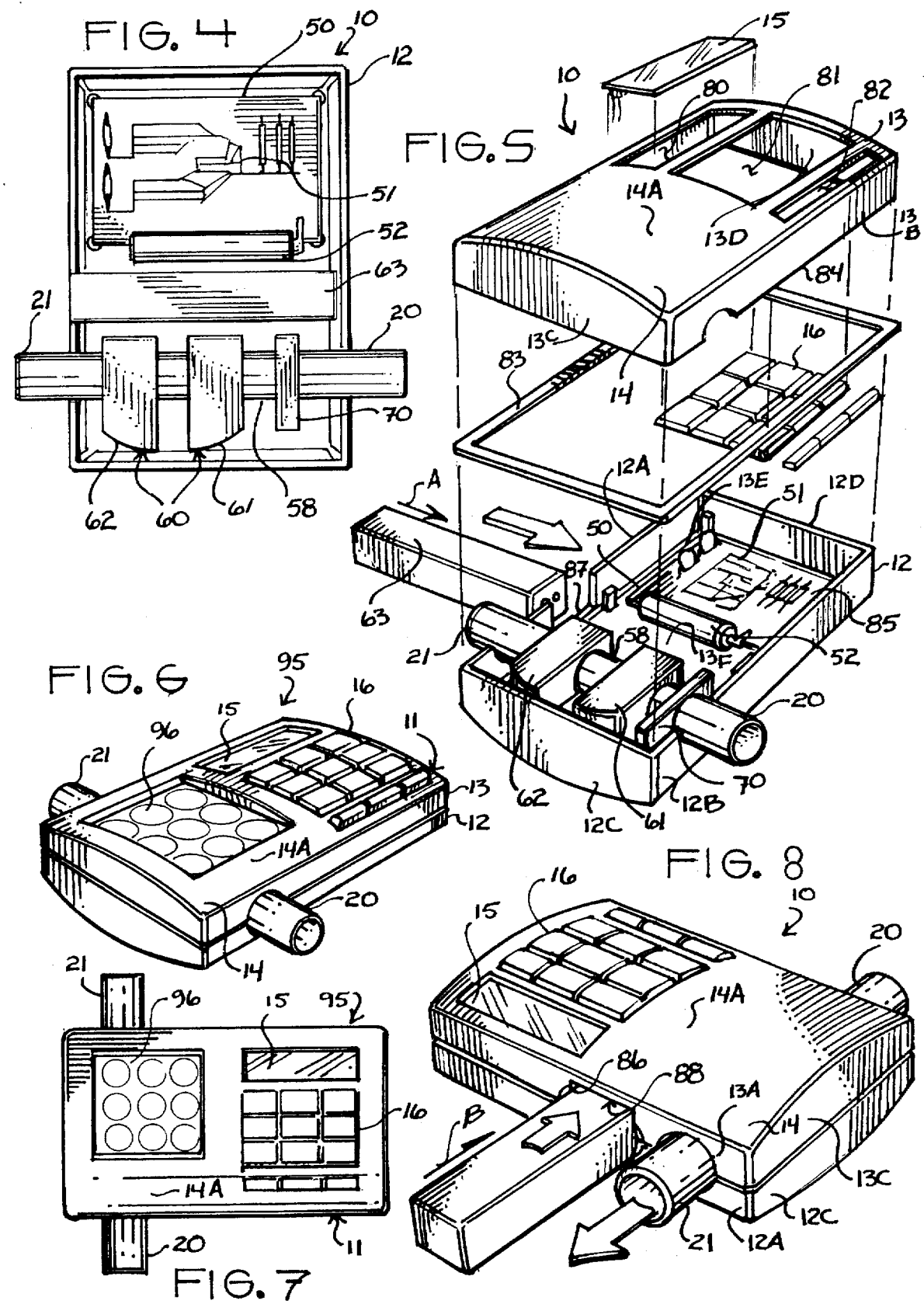

PORTABLE FLUID DISPENSING APPARATUS

BACKGROUND OF THE INVENTION

1. Field of the Invention

This invention relates to fluid dispensing devices.

More particularly, this invention relates to portable fluid dispensing devices.

In a further and more specific aspect, the instant invention relates to a portable and programmable fluid dispensing device usable with an existing fluid dispensing system.

2. Prior Art

The transportation of fluid from one location to another location has occasioned the advent of an array of fluid transportation apparatus. Although a fluid generally consists of any liquid or gas, it is more generally defined as any material that cannot sustain a tangential, or shearing, force when at rest and that undergoes a continuous change in shape when subjected to such a stress. Because differing fluids generally enjoy different fluid characteristics, such as varying viscosities or flow characteristics, transportation systems or apparatus have been similarly constructed to accommodate such variances for effecting efficient transfer from one location, to one or more remote locations.

Typical fluid transportation systems consist of those for arranging for the transport of water, a fluid, from areas of water abundance to one or more areas of water shortage. Specific water transportation systems currently in use throughout various parts of the more industrialized portions of the world consist of watering systems designed for selectively transporting water to foliage desired to be supplied with water. These water transportation systems, otherwise known as sprinkler systems, can be either automatic, or manual, and normally consist of a series of either above ground or below ground piping sized to transport pressurized water from a water source to a water distribution apparatus such as a conventional sprinkler head that when supplied with water, distributes the water to a particular plant, shrub, or area having foliage planted thereon requiring watering.

Representative and well known sprinkler systems normally employed throughout much of the United States and certainly other portions of the world, are those that are permanent and positioned or installed below the ground, having selectively interspersed sprinkler heads that rise to the surface for supplying water to a desired location. Normally, the positioning of sprinkler heads is choreographed to mirror a desired configuration of water dispersal normally consistent with the nature of the landscape to be watered. Typical landscaping consists of organizing an array of various plant types throughout a selected area, plant growth of which may consist of one or more types of grass, trees, shrubs, flowers, and other desired plant types. Watering needs are therefore dependent upon how the plant types are distributed, and the watering needs of the various plant types. Accordingly, many modern sprinkler systems employ timers and other like apparatus for controlling the time duration and frequency of watering.

Once a conventional sprinkler or watering system is installed, such as that herein described, the distribution of water from that sprinkler or watering system is static. In other words, if the nature or extent of the landscaped area to be watered changes, which in turn alters the watering needs of that landscaped area, the previously installed sprinkler or watering system may be inadequate to meet those alterations or changes in the watering needs. In order to accommodate this need, it becomes necessary to edit the existing sprinkler system by either adding to or reconfiguring the existing system to satisfy the altered watering needs. This process usually consists of having to exude some or all of the portions of the existing sprinkler system to sufficiently edit the system to meet the altered watering needs, or add additional underground sprinkling apparatus. This process is normally not only time consuming, but also terribly expensive, frustrating, and also quite damaging to the existing landscape.

It would be highly advantageous, therefore, to remedy the foregoing and other deficiencies inherent in the prior art.

Accordingly, it is an object of the present invention to provide a portable fluid dispensing apparatus.

Another object of the present invention is to provide a portable fluid dispensing apparatus usable with existing fluid dispensing systems, such as conventional sprinkler or watering systems for use in selectively dispersing water to one or more desired and remote locations.

And another object of the present invention is to provide a portable fluid dispensing device that is easy to use.

Still another object of the present invention is to provide a portable fluid dispensing device that accommodates the changing water needs of a selected area.

Yet another object of the instant invention is to provide a portable fluid dispensing device that is inexpensive to manufacture.

Yet still another object of the instant invention is to provide a portable fluid dispensing device that is inexpensive.

And a further object of the invention is to provide a portable fluid dispensing device that may be used to establish temporary watering zones as selectively needed.

Still a further object of the immediate invention is to provide a portable fluid dispensing device capable of establishing an array of selected watering zones as needed.

Yet a further object of the invention is to provide a portable fluid dispensing device that is selectively programmable for allowing an array watering durations.

And still a further object of the invention is to provide a portable fluid dispensing device that is selectively programmable for allowing an array of watering frequency.

And yet still a further object of the instant invention is to provide a portable fluid dispensing apparatus that is versatile.

SUMMARY OF THE INVENTION

Briefly, to achieve the desired objects of the instant invention in accordance with a preferred embodiment thereof, provided is a portable apparatus for selectively delivering a fluid to at least one selected remote location for a selected duration. The apparatus includes a housing having an inlet for receiving the fluid from a fluid source, and an outlet for expelling the fluid. Further included is a valve control means, preferably comprised of a valve assembly, disposed intermediate the inlet and the outlet for controlling the passage of fluid from the inlet to the outlet and movable between an open position for allowing fluid to pass from the inlet to the outlet, and a normal closed position for inhibiting the passage of fluid from the inlet to the outlet. Yet still further included is a fluid sensitive actuator means, preferably a fluid sensitive transducer, operative for sensing a fluid stimulus, preferably fluid pressure, and for opening the valve assembly consonant therewith. A programmable duration control means, preferably a clock timer assembly, is also included and is operative for actuating the transducer, and for selectively closing the valve assembly after fluid has passed through the outlet for a selected duration.

BRIEF DESCRIPTION OF THE DRAWINGS

The foregoing and further and more specific objects and advantages of the instant invention will become readily apparent to those skilled in the art from the following detailed description of preferred embodiments thereof taken in conjunction with the drawings in which:

FIG. 1 is an enlarged perspective view of an embodiment of the instant invention constructed in accordance with the preferred embodiment;

FIG. 2 is reduced perspective view of the instant invention as it would appear in use;

FIG. 3 is a top plan view of the instant invention;

FIG. 4 is a top plan view of the instant invention with portions thereon removed for the purpose of illustration;

FIG. 5 is an exploded perspective view of the instant invention first illustrated in FIG. 1;

FIG. 6 is a perspective view of an alternate embodiment of the instant invention;

FIG. 7 is a top plan view of the embodiment depicted in combination with FIG. 6; and FIG. 8 is a perspective view of the instant invention first depicted in combination with FIG. 1, and further illustrating a power source being inserted therein.

DETAILED DESCRIPTION OF THE PREFERRED EMBODIMENT

Turning now to the drawings, in which like reference characters indicate corresponding elements throughout the several views, attention is first directed to FIG. 1 which illustrates a first embodiment of the instant invention comprising a portable fluid dispensing apparatus, the apparatus being generally designated by the reference character 10. The apparatus 10 depicted in FIG. 1 includes a housing 11 having a base 12 and a cover portion 13. The housing 11 illustrated is shown as being substantially rectangular in shape. It will readily appreciated by those having skill in the art, that housing 11 may be of any preferred shape as selectively desired. Cover portion 13 includes a cover panel 14 having an outer surface 14A. Disposed in the cover portion 13 proximate cover panel 14 is seen a liquid crystal display (LCD) 15 with a push button assembly 16 for setting the various functions of the apparatus 10, the specifics of which will be discussed as the detailed description continues.

Apparatus 10 further includes an inlet 20, and an outlet 21, both of which can be seen as passing through portions of housing 11. Inlet 20 is coupled to supply line 22 by means of a union fitting 23. Additionally, outlet 21 is coupled to a first outlet line 24 and a second outlet line 25 by means of tee joint 26.

In operation, fluid, such as water, is introduced into inlet 20 from supply line 22. Although not herein specifically shown, supply line 22 is connected to a remote water or fluid source that supplies water or fluid under pressure to apparatus 10. The fluid then passes through portions of the apparatus and subsequently through outlet 21. From outlet 21, the fluid then passes through tee joint 26 and consequently through the first outlet line 24 and the second outlet line 25 to a selected remote location.

With reference directed specifically to FIG. 2, apparatus 10 may properly be utilized for directing or supplying water, herein specifically discussed as a preferred fluid for use with the instant invention, from a water source to a remote location or place of water shortage. As can be seen from FIG. 2, when apparatus 10 activates, details of which will be herein discussed as the detailed description ensues, and receives water therethrough, second outlet line 25 delivers water to a selected and desired location, which, for the purposes of illustration, can be seen as first location 30 which includes a first plant 31. Furthermore, it can also be seen that first outlet line 24 is in turn coupled to tee joint 32, which is in turn coupled to first remote outlet line 33 and second remote outlet line 34. Like second outlet line 25, first remote outlet line 33 operates for delivering water to second location 35 which includes a second plant 36, and second remote line 34 operates for delivering water to third location 37 which includes third plant 38.

It will be understood in light of the above discussion, that apparatus 10 may be selectively coupled to an existing water system or source and may be selectively oriented to deliver water to one or more desired and selected locations remote from the water source. Furthermore, as can be seen with reference to FIG. 3, any number and combination of outlet lines may be used in conjunction with the instant invention as is suitably desired for directing water or other fluid to any number of desired and remote locations. For the purpose of illustration, FIG. 3 illustrates a second tee joint 39 having second outlet lines 40 and 41 coupled thereto, the second tee joint 39 being coupled to a first tee joint 42 which in turn includes first outlet lines 43 and 44 coupled thereto.

Reference is now directed to FIG. 4 which illustrates apparatus 10 with cover portion 13 removed therefrom. Carried within base 22 is shown a clock timer assembly being generally designated by the reference character 50. Clock timer assembly 50 includes timer circuitry 51, and is of conventional design, details of which will not be herein specifically addressed as they will be readily known to those having ordinary skill in the art. Clock timer assembly 50 includes a clock timer power source 52, operative for supplying power to the clock timer assembly 50. Any type of power source may be used for supplying power to the clock timer assembly 50 herein disclosed. However, for the purpose of the preferred embodiment, the power source 52 herein disclosed includes a conventional lithium battery.

The clock timer assembly 50 includes input terminals (not herein specifically shown) for connection to power source 52, and output terminals (not herein specifically shown) for connection to valve assembly 60. The valve assembly 60, positioned intermediate inlet 20 and outlet 21 in combination with conduit 58, includes a fluid inlet valve 61 and a fluid outlet valve 62. The fluid inlet valve 61 and the fluid outlet valve 62 each is an electrically actuated, normally closed, conventional solenoid operated valve. Valves 61 and 62 are electrically actuated or energized by power source 63, and each include inputs (not herein specifically shown) for connection to power source 63, and inputs (not herein specifically shown) for connection to clock timer assembly 50. Although power source 63 may be of any preferred and suitable type, for the purpose of disclosing the preferred embodiment, power source 63 is preferably a transient power source comprised of a rechargeable battery pack of the type normally used in combination with Cellular® phones or mobile phones. The valve assembly 60 functions as a valve control means for controlling the passage of fluid from inlet 20 to outlet 21. As has been herein discussed, the valve control means includes an on position for allowing fluid to pass from the inlet 20 to the outlet 21, and a closed position for inhibiting the passage of fluid from the inlet 20 to the outlet 21. Although the valve assembly 60 has been herein described as the preferred embodiment of the valve control means, it will readily understood that other embodiments of a valve control assembly may be used in combination with the instant invention without departing from the nature and scope of the invention as herein discussed. For instance, instead of having a fluid inlet valve and a fluid outlet valve, it will be readily understood that a single valve may be used in combination with the instant invention as selectively desired.

Apparatus 10 further includes a transducer 70 coupled to conduit 58 within base 22 proximate inlet 20. The conduit 58, through which water or fluid passes, can be seen as being generally cylindrical and includes inlet 20 and outlet 21. The transducer 70 is electrically actuated, and of the type responsive to stimuli such as preferably fluid or water pressure. Although transducer 70 is preferably of the type sensitive to fluid or water pressure, the transducer may also be of the type sensitive to the presence or absence or fluid liquid or fluid vapor. Like the valve assembly 60, transducer 70 is electrically actuated by power source 63 and includes input terminals (not herein specifically shown) for connection to power source 63 and clock timer assembly 50, and output terminals (not herein specifically shown) for connection to the valve assembly 60. As has been herein intimated, and like well known transducers, transducer 70 is configured to sense a fluid stimulus, such as fluid pressure or the presence of liquid or liquid vapor, and upon sensing such stimulus, produces an electrical output signal. Although the preferred transducer for disclosed in combination with the preferred embodiment is responsive to fluid pressure, any conventional and desired transducer suitable for use in combination with the instant invention may be used as desired.

The transducer 70 as herein discussed functions as a fluid sensitive actuation means for sensing a fluid stimulus and for contemporaneously opening the valve control means, or valve assembly 60, in response to the fluid stimulus, which may be configured to be a predetermined fluid sensory point. The fluid sensory point can be a selected fluid pressure level, the presence of fluid pressure at any level, or alternately, the presence or absence of fluid in any form, such as liquid or vapor. The fluid sensitive actuation means, the transducer 70, is further operative for closing the valve control means, or valve assembly 60, when the fluid sensory point falls below a predetermined fluid sensory point, or a point at which a physical fluid stimulus is no longer sensed by the transducer 70.

Apparatus 10 is specifically designed to operate from an existing and permanent underground sprinkler or watering system to enhance or expand the existing sprinkler or watering system, or to deliver water to areas where the existing sprinkler system or watering system is not able to adequately supply or deliver water. The instant invention may also be coupled to any water source capable of providing a pressurized water source provided under pressure such as a conventional hose coupled to a water source. In operation, the clock timer assembly 50 may be specifically programmed to actuate apparatus 10 at a selected time, and for a selected duration of time, for delivering water at the selected time for the selected duration of time. The clock timer assembly 50 may be selectively programmed by use of push button assembly 16, the settings of which naturally become visually displayed by means of the liquid crystal display 15 which is electrically coupled to the clock timer assembly 50. Once apparatus 10 is actuated, it will function as a means for delivering water or fluid to one or more selected and remote locations as herein specifically described in combination with FIG. 2.

When the clock timer assembly 50 has been activated or actuated to activate apparatus 10 at a specified time for a specified duration, the transducer 70 becomes immediately or contemporaneously actuated to sense a fluid stimulus provided through inlet 20. When transducer 70 senses the fluid stimulus, the fluid stimulus of which may be selectively input by means of the push button assembly 16, the transducer 70 actuates fluid inlet valve 61 to an open position, and fluid outlet valve 62 to an open position which allows fluid or water to pass from inlet 20 to outlet 21 for delivering water to one or more remote locations. Contemporaneously with the actuation of valves 61 and 62 to their respective open positions, the clock timer assembly 50 begins counting down the selected time duration entered therein relating to the duration apparatus 10 is to deliver water to selected locations. Once the specified duration has elapsed, the clock timer assembly 50 moves the fluid inlet valve 61 to a closed position thereby preventing the passage of water therethrough, and moves the fluid outlet valve 62 to a closed position thereby preventing the passage of water therethrough.

If the clock timer assembly 50 is not set or programmed to actuate the apparatus 10 for a selected period of time, and fluid or water under pressure is introduced into inlet 20 from a pressurized water source, transducer 70, if energized or actuated, will toggle the valve assembly to the on position upon sensing water pressure at a predetermined pressure point, thereby allowing fluid or water to pass therethrough to outlet 21. Furthermore, when the water pressure falls below the predetermined pressure point or when the water pressure is no longer present because water is no longer being supplied to inlet 20, the transducer 70 will toggle the valve control assembly 60 to the off position.

The clock timer assembly 50 is operatively functional as a duration control means, selectively adjustable for actuating the transducer 70, and for selectively moving the valve assembly 60 to a closed position after the fluid has passed through the apparatus 10 for a selected and predetermined duration.

Reference is now directed to FIG. 5 which illustrates an exploded perspective view of the instant invention. As evidenced in the instant illustration, cover panel 14 includes a first window 80, a second window 81, and a third window 82. First window 81 operates for receiving the liquid crystal display 15, and the second and third windows, 81 and 82, operate for receiving therethrough the push button assembly 16. Although not herein specifically shown, in operation, the push button assembly 16 and the liquid crystal display 15 couple to portions of the timer circuitry 51. Further seen in FIG. 5 is a gasket member 83 positioned intermediate the cover portion 13 and the base 12. When the cover portion 13 and the base 12 are brought together, the peripheral rim 84 of the cover portion 13 and the peripheral rim 85 of the base come together and engage gasket member 83, such that when the cover portion 13 and the base 12 are secured together, the gasket member 83 operates for inhibiting moisture and foreign matter from passing inside the apparatus 10 which could damage the internal working parts as herein described. The cover portion 13 and the base 12 of housing 11 may be secured together by means of screws, a selected adhesive, or some other suitable securing means as selectively desired. The housing 11 is preferably constructed of a durable, weather resistant, waterproof, high impact plastic material, or some other selected and suitable material having similar physical and operative characteristics.

With continuing reference to FIG. 5, and additional reference to FIG. 8, it can be seen that cover portion 13 includes a pair of sidewalls, 13A and 13B, and a pair of end walls, 13C and 13D, while base 12 includes a pair of sidewalls, 12A and 12B, a pair of endwalls, 12C and 12D, and a base panel 13E having inner surface 13F. it can be seen that housing 11 includes aperture 86 through which may be easily inserted or removed power source 63. Aperture 86 is formed in combination with recess 87 formed through portions of sidewall 12A of base 12, and another recess 88 formed through portions of sidewall 13A of cover portion 13 and diametrically opposed to recess 87. Power source may be easily inserted through aperture 86 in the direction indicated by the arrowed line A in FIG. 5 and the arrowed line B in FIG. 8, for engaging and supplying power to apparatus 10. Likewise, power source 63 may also be easily removed through aperture 86 when it runs out of power.

It will be understood, that when power source 63 runs out of power, it may be removed, recharged, and then inserted back into apparatus 10 as desired. Since power source 52 and power source 63 function independently of one another, power source 52 continually supplies power to the clock timer assembly 50 for retaining the time and selected settings input therein for regulating the operation of apparatus 10. In other words, even with power source 63 removed from apparatus 10, power source 53 maintains a constant power supply to the clock timer assembly 50.

Reference is now directed to FIG. 6 and FIG. 7, which illustrate an alternate embodiment of the instant invention comprising a portable fluid dispensing apparatus being generally designated by the reference character 95. Apparatus 95 includes all of the components herein described in combination with the embodiment depicted and described in combination with FIG. 1–FIG. 5, and FIG. 8, but further includes a photocell array 96 for providing a solar power source.

Various changes and modifications to the embodiment herein chosen for purposes of illustration will readily occur to those skilled in the art. To the extent that such modifications and variations do not depart from the spirit of the invention, they are intended to be included within the scope thereof which is assessed only by a fair interpretation of the following claims.

Having fully described the invention in such clear and concise terms as to enable those skilled in the art to understand and practice the same, the invention claimed is:

1. A portable apparatus for selectively dispensing a fluid under a pressure from a fluid source to at least one selected remote location, said apparatus comprising:

a housing;

an inlet, proximate said housing, for receiving said fluid from said fluid source, said inlet being in fluid communication with said fluid source;

an outlet, proximate said housing, for expelling said fluid;

valve control means, carried therein said housing, for controlling the passage of said fluid from said inlet to said outlet, said valve control means movable between an open position for allowing said fluid to pass from said inlet to said outlet, and a normal closed position for inhibiting the passage of said fluid from said inlet to said outlet; and a fluid sensitive actuation means, carried therein said housing, for sensing a fluid stimulus provided from said fluid, and for moving said valve control means to said open position consonant therewith, and for moving said valve control means to said closed position absent said fluid stimulus.

2. The apparatus of claim 1, wherein said valve control means includes a valve assembly.

3. The apparatus of claim 2, wherein said valve assembly includes:

a fluid inlet valve; and a fluid outlet valve, wherein said fluid inlet valve and said fluid outlet valve are disposed intermediate said inlet and said outlet.

4. The apparatus of claim 3, further including a transient power source for supplying power to said valve assembly.

5. The apparatus of claim 4, wherein said transient power source includes a rechargeable battery pack.

6. The apparatus of claim 5, wherein said fluid sensitive actuation means includes a transducer carried therein said housing intermediate said valve assembly and said inlet, said transducer being actuated by said power source.

7. The apparatus of claim 1, wherein said fluid stimulus includes fluid pressure.

8. A portable apparatus for selectively dispensing a fluid under a pressure to a selected place for a selected duration, said apparatus comprising:

a housing;

an inlet, proximate said housing, for receiving said fluid from a fluid source, said inlet being in fluid communication with said fluid source;

an outlet, proximate said housing, for expelling said fluid;

valve control means, carried therein said housing, for controlling the passage of said fluid from said inlet to said outlet, said valve control means movable between an open position for allowing said fluid to pass from said inlet to said outlet, and a normal closed position for inhibiting the passage of said fluid from said inlet to said outlet;

a fluid sensitive actuation means for sensing a fluid stimulus provided from said fluid, and for opening said valve control means consonant therewith; and a duration control means, selectively adjustable and programmable for actuating said fluid sensitive actuation means, and for selectively moving said valve control means to said closed position after said fluid has passed through said outlet for a selected duration.

9. The apparatus of claim 8, wherein said valve control means includes a valve assembly.

10. The apparatus of claim 9, wherein said valve assembly includes:

a fluid inlet valve; and a fluid outlet valve, wherein said fluid inlet valve and said fluid outlet valve are disposed intermediate said inlet and said outlet.

11. The apparatus of claim 10, further including a transient power source for supplying power to said valve assembly.

12. The apparatus of claim 11, wherein said transient power source includes a rechargeable battery pack.

13. The apparatus of claim 12, wherein said fluid sensitive actuation means includes a transducer carried therein said housing intermediate said valve assembly and said inlet, said transducer being powered by said power source.

14. The apparatus of claim 8, wherein said duration control means includes a programmable clock timer assembly.

15. The apparatus of claim 14, wherein said clock timer assembly includes a clock timer power source for supplying power to said clock timer assembly.

16. The apparatus of claim 8, further including a push button assembly operative for selectively programming said duration control means.

17. The apparatus of claim 8, further including a liquid crystal display, disposed proximate said housing, for displaying information relating to the duration control means.

* * * * *